United States Patent

[15] 3,689,678

Fox et al.

[45] Sept. 5, 1972

[54] SOLID BATH OIL COMPOSITION CONTAINING A CLATHRATE

[72] Inventors: Charles Fox; James Tassoff, both of Fairlawn, N.J.

[73] Assignee: Warner-Lambert Company, Morris Plains, N.J.

[22] Filed: April 3, 1968

[21] Appl. No.: 718,372

Related U.S. Application Data

[63] Continuation-in-part of Ser. No. 487,623, Sept. 15, 1965, abandoned.

[52] U.S. Cl. .................................................. 424/365
[51] Int. Cl. ................................................ A61k 7/00
[58] Field of Search ........................... 424/365, 322

[56] References Cited

UNITED STATES PATENTS

| | | | |
|---|---|---|---|
| 2,448,664 | 9/1948 | Fife et al. | 260/615 B |
| 2,559,583 | 7/1951 | Barker | 424/322 X |
| 2,665,256 | 1/1954 | Barker | 424/322 X |

OTHER PUBLICATIONS

Sagarin Cosmetics Science and Technology, 1957, pp. 653 to 659.

*Primary Examiner*—Albert T. Meyers
*Assistant Examiner*—Dale R. Ore
*Attorney*—Albert H. Graddis, Henry E. Millson, Jr. and Frank S. Chow

[57] ABSTRACT

A solid bath oil composition containing bath oil adjuvant materials is prepared in the form of a dry, free-flowing powder or a molded configuration by utilizing urea, thiourea, or a mixture thereof as a clathrating agent to occlude the liquid, oily components of the bath preparation. The solid clathrate system thus formed releases the emollient oil upon contact with an aqueous medium.

14 Claims, No Drawings

SOLID BATH OIL COMPOSITION CONTAINING A CLATHRATE

CROSS REFERENCE TO RELATED APPLICATION

This application is a continuation-in-part of our copending application, U.S. Ser. No. 487,623, filed Sept. 15, 1965, now abandoned.

BACKGROUND OF THE INVENTION

The advantages of particular bath oil preparations and the wide use thereof is well known to the art. Typically, they are liquid oily preparations which are added to bath water. Such preparations because of their liquid oily nature are awkward and messy to use and to dispense. The oily preparations also severely limit the types of components which may be included in any single preparation. For example, heretofore, it has been difficult or impossible to add certain water softeners, marine algae, dry milk solids, sea salts and the like to prior bath oil preparations. Moreover, some bath oil preparations are subject to deterioration by oxidation.

The general concept of clathration compounds is well known to the art. For example, it is well known that certain organic Werner complexes are capable of selectively occluding, either during or after formation of crystalline structures, certain other compounds within the crystalline structure. Even compounds of similar chemical and physical properties may be occluded to form clathration systems although to a much smaller extent than chemicals having dissimilar chemical and physical properties. The specific explanation for the phenomenon of clathration is not known with certainty although present theories indicate that the mechanism may be explained on the basis of clathrate formation between the occluding material and the material being occluded. The mechanism as well as explanation of the theory of clathration have become confused because of the use of different nomenclature for defining clathration systems. Clathration systems have been referred to by terms such as occlusion complexes, crystalline mixtures, adducts, and the like. These systems, however, have in common the characteristic that the complex which is formed is not a true crystalline structure as the molecules of one of the components are contained within the crystalline lattice of the occlusion component in non-stoichiometric proportions. The crystalline lattice framework may be in the form of channels, cages or layers with the particular framework depending upon the molecular dimensions as well as other characteristics of the components involved in forming the system. The complexes so formed are typically stable at ordinary temperatures but melt or dissolve in similar fashion as the individual components of the crystalline structure.

SUMMARY OF THE INVENTION

This invention relates to a solid bath oil composition containing bath oil adjuvant materials, which is prepared in the form of a dry, free-flowing and moldable powder by occluding the liquid, oily components of the bath preparation with urea and/or thiourea. The solid clathrate system formed releases the emollient oil or oils contained therein upon contact with an aqueous medium.

DESCRIPTION OF THE INVENTION

It has now been found that the disadvantages of prior oily bath preparations may be overcome by incorporating particular oils and especially emollient oils as clathrate compounds which take the form of finely divided, free-flowing powder. Urea is used as the clathrating agent for the emollient oils which have an essentially straight chain configuration in the molecule; a small amount of branching, e.g. in isopropyl myristate, does not interfere with the clathration but for oils having predominantly branched chains or cyclic structures, thiourea should be used in order to insure total clathration. When a formulation of both straight chain and branched chain oils is selected, both urea and thiourea should be used.

The advantages which accrue from our solid bath oil compositions include, for example, the containment of easily oxidizable materials of the nature of highly unsaturated oils in a form protected from oxidation which otherwise occurs when such oils are retained in the liquid state. In addition, various powdered bath oil adjuvant materials may be combined with our solid clathrate powders which could not previously be included in standard oily systems. For example, bath oil adjuvant materials including the following: water softeners, such as sodium carbonate, sodium carbonate monohydrate, sodium sesquicarbonate, and sodium tripolyphosphate; marine algae, including the alginates (potassium alginate) and the carragheenates (Irish Moss); dry milk solids, such as powdered milk; sea salts, such as magnesium sulfate; and coloring or tinting agents, may now be employed in combination with our clathrate powders to form solid bath oil compositions which previously would have been difficult or impossible to formulate.

Various other additives may be combined with the oil or oils, prior to clathrate formation. For example, non-ionic surface active agents which promote spreading of the oils upon dissolution in an aqueous system may be used. While all non-ionic surface active agents which are non-irritating to the skin are operable in the solid bath oil preparation of our invention, the ethers made by ethoxylating fatty alcohols such as lauryl, cetyl, myristyl, stearyl and oleyl alcohols are particularly preferred. In particular, the condensates of between 2 to 20 moles of ethylene oxide with cetyl alcohol are particularly preferred.

Tinting or coloring agents may also be added to the emollient oils prior to clathrate formation to enhance the appearance of the final powdered bath oil composition.

Perfumes may be included in the solid bath oil preparations of our invention at any time, as desired. If added after the formation of the clathrate powder, the perfumes are absorbed on the surface of the solid bath oil particles. Inasmuch as the perfume does evaporate from such a product upon prolonged exposure to air, a more desirable perfumed product is obtained by combining the perfume oil with the emollient oil so it is contained within the clathrate system. As already discussed for the emollient oil ingredients, a thiourea clathrating agent should be used if the perfume oil in use has a branched chain or cyclic structure.

The term "bath oil adjuvant material" is meant to include any desirable bath additive which previously could not be added to a liquid oily bath composition. These materials are added in an amount sufficient to achieve the desired effect. Generally, minor amounts are added but this amount will vary to a large extent, depending upon the nature of the material added and whether it is added alone or in combination with other bath oil adjuvant materials. Of course, the final product is a dry, free-flowing and moldable powder.

In addition to preparing bath preparations as powders, other molded forms are possible such as compressed tablets or various shapes and configurations which would have marketing advantages.

This invention, therefore, provides a new and novel clathration system wherein oils are occluded within a clathrate system such that the resulting preparation is a dry, free-flowing and moldable powder.

The new and novel bath oil preparations of this invention in the form of dry, free-flowing, or moldable powders, release the emollient oils therein upon contact with an aqueous medium.

In preparing the new and novel bath preparation of the present invention, a clathrate system is formed by dissolving urea, thiourea, or a mixture thereof, and the desirable oil or combination of oils in a suitable solvent, such as a lower alcohol. Typically, methanol is used; however, other alcohols, such as ethanol, are also suitable. The emollient oil or oils which can be occluded by the clathrating agent to form the product of this invention are of the class commonly used in bath oil preparations. Particularly preferred emollient oils are, for example, isopropyl myristate, mineral oil, isopropyl stearate, isopropyl linoleate, oleyl alcohol, cetyl alcohol, tetrahydrogeranyl palmitate, isocetyl isostearate, and synthetic oils obtained by the reaction of a monohydroxy aliphatic alcohol with an alkylene oxide comprising predominantly 1,2-propylene oxide. The synthetic polymer oils of this type are described in U.S. Pat. No. 2,448,664 and are sold commercially as the UCON LB series of lubricants by Union Carbide Corp., N.Y., N.Y. They are water immiscible polymer products with lubricating properties which have an average of at least 9 oxy-1,2-propylene groups in each molecule. The alcohols which are reacted with the alkylene oxide to form these polymer oils are normal or branched chain alcohols of one to 20 carbon atoms. The synthetic oil products of this type which are preferred for use in this invention have a viscosity ranging from 65 to 1,715 Saybolt seconds (11.75–371 centistokes) at 100° F. The average molecular weight of the operable polymers is between 1,000 and 3,000 calculated by acetyl values. Of these, one particular product, UCON LB 1715, which has a viscosity of 1,715 Saybolt seconds at 100° F., is particularly preferred. U.S. Pat. No. 2,668,150, patented Feb. 2, 1954, describes Ucon LB 1715 as the monobutyl ether of a polyoxypropylene diol having a molecular weight of approximately 2,000 to 2,100 derived by the addition of 1,2-propylene oxide to butyl alcohol.

The components of the clathrate system in this invention are employed in a ratio of from about 1 to about 10 parts, preferably from about 1 to about 5, and most preferably from about 3 parts by weight of urea per part by weight of oil. If thiourea is employed, the ratio should be from about 1 to about 10 parts, preferably from about 2 to about 10 parts per part by weight of oil.

The solvent is employed in the clathrate system in an amount from about 20 parts to about 40 parts by weight, based on the weight of the total clathrate system.

The ingredients, in amounts prescribed, are combined and mixed while heating to a temperature ranging from about 50° to about 70° C. The heated mixture is thereafter slowly cooled to room temperature (about 20° to about 22° C.) and filtered. The solvent, for the most part, is removed in the filtration step. The resulting crystals may thereafter be washed, if desired, with a suitable material such as ethyl ether or the like and thereafter the washed crystals may be air dried. The air dried crystals which may contain bath oil adjuvant materials within the clathration system can be employed alone or in combination with other solid bath oil adjuvant materials such as water softeners, marine algae, dry milk solids, sea salts and the like. Such materials have not been successfully added to prior art liquid bath oil preparations. The prepared clathrate containing bath composition of our invention may be employed as free-flowing powder or may be molded or compressed into any desirable form such as tablets, various molded configurations or the like.

The invention may be further exemplified by the following examples.

EXAMPLE 1

The following components in amounts indicated are combined and mixed while heating to a temperature of 50°–60 C. until the mixture becomes clear:

| | |
|---|---|
| Isopropyl Myristate | 1 part |
| Urea | 5 parts |
| Methanol | 20 parts |

The solution is thereafter slowly cooled to room temperature in the open atmosphere and after reaching room temperature, the solution is filtered. The resulting crystals so recovered are washed with ethyl ether and air dried to form a dry, free-flowing powder having an average particle size of about 20 to about 50 mils. An average particle size of 10 to about 85 mils may also be prepared by methods known to the art. Upon addition of the dried particles to a water-containing environment, the occluded oils are released and provide an oily film on the surface of the water containing environment.

The following preparations are prepared using the clathrate compound of Example 1:

EXAMPLE 2

| | |
|---|---|
| Clathrate compound | 8 parts |
| Dry Milk Solids | 2 parts |

EXAMPLE 3

| | |
|---|---|
| Clathrate compound | 8 parts |
| Sodium tripolyphosphate | 1 part |
| Magnesium sulfate | 1 part |

EXAMPLE 4

| | |
|---|---|
| Isopropyl myristate | 0.9 parts |
| UCON LB 1715* | 0.1 parts |
| Urea | 5 parts |
| Methanol | 20 parts |

*Trade marked product of Union Carbide Company prepared as described in U.S.P. 2,448,664.

The clathrate obtained from this mixture is used as follows:

| | |
|---|---|
| Sodium tripolyphosphate | 5 parts |
| Magnesium sulfate | 5 parts |
| Potassium alginate | 2 parts |
| Perfume Oil | 0.5 parts |
| above clathrate | 87.5 parts |

When added to water this product quickly dissolves to leave a thin layer of perfumed oil spread on the surface while softening the water to prevent soap curds.

The following compositions may also be formulated in accordance with the procedure of the examples previously indicated:

EXAMPLE 5

| | |
|---|---|
| Mineral Oil Lt. Tech. | 9 parts |
| Urea | 5 parts |
| Perfume Oil | 0.1 part |
| Methanol | 20 parts |

EXAMPLE 6

| | |
|---|---|
| Mineral Oil Lt. Tech. | 0.8 parts |
| Cetyl Alcohol | 0.1 part |
| Urea | 5 parts |
| Perfume Oil | 0.1 part |
| Methanol | 20 parts |

EXAMPLE 7

| | |
|---|---|
| Mineral Oil Lt. Tech. | 0.9 parts |
| Ethoxylated Cetyl Alcohol (containing 10 moles of ethylene oxide) | 0.1 part |
| Urea | 5 parts |
| Methanol | 20 parts |

EXAMPLE 8

| | |
|---|---|
| Glycerol Monolaurate | 0.8 parts |
| Ethoxylated Cetyl Alcohol (containing 10 moles of ethylene oxide) | 0.1 part |
| Isopropyl Stearate | 0.1 part |
| Urea | 5 parts |
| Methanol | 20 parts |

EXAMPLE 9

| | |
|---|---|
| Mineral Oil Lt. Tech. | 1 part |
| Isocetyl Isostearate | 0.9 parts |
| Perfume Oil | 0.1 part |
| Urea | 5 parts |
| Thiourea | 5 parts |
| Methanol | 20 parts |

EXAMPLE 10

| | |
|---|---|
| Isopropyl Linoleate | 0.9 parts |
| Perfume Oil | 0.1 part |
| Urea | 5 parts |
| Methanol | 20 parts |

EXAMPLE 11

| | |
|---|---|
| Clathrate Compound | 8 parts |
| Potassium Alginate | 2 parts |

EXAMPLE 12

| | |
|---|---|
| Clathrate Compound | 8 parts |
| Irish Moss | 2 parts |

It is understood that the foregoing detailed description is given merely by way of illustration and that many variations may be made therein without departing from the spirit of this invention.

What is claimed is:

1. A solid bath oil composition which comprises:
   a. a clathrating agent selected from the group consisting of urea, thiourea and mixtures thereof;
   b. at least one emollient oil selected from the group consisting of isopropyl myristate, mineral oil, isopropyl stearate, isopropyl linoleate, oleyl alcohol, cetyl alcohol, tetrahydrogeranyl palmitate, isocetyl isostearate and a synthetic polymer oil obtained by reacting butyl alcohol with 1,2-propylene oxide, wherein said polymer has a viscosity of 1715 Saybolt seconds at 100°F; and
   c. at least one bath oil adjuvant material selected from the group consisting of sodium carbonate, sodium carbonate monohydrate, sodium sesquicarbonate, sodium tripolyphosphate, potassium alginate, Irish Moss, dry milk solids, magnesium sulfate, and ethoxylated cetyl alcohol containing 10 moles of ethylene oxide; wherein the ratio of the oil to the clathrating agent is from about 1 to about 10 parts by weight of clathrating agent per part by weight of emollient oil.

2. A solid bath oil composition according to claim 1 wherein the clathrating agent is urea which is present in from about 1 to about 5 parts by weight per part by weight of the emollient oil.

3. A solid bath oil composition according to claim 1 wherein the clathrating agent is thiourea which is present in from about 2 to about 10 parts by weight per part by weight of emollient oil.

4. A solid bath oil composition according to claim 1 wherein the clathrate compound formed from (a) and (b) is present in an amount of about 8 parts by weight; and wherein the bath oil adjuvant material (c) is potassium alginate which is present in an amount of about 2 parts by weight.

5. A solid bath oil composition according to claim 1 wherein the clathrate compound formed from (a) and (b) is present in an amount of about 8 parts by weight; and wherein the bath oil adjuvant material (c) is Irish Moss which is present in an amount of about 2 parts by weight.

6. A solid bath oil composition comprising:
   a. about 2 parts by weight of dry milk solids; and
   b. about 8 parts by weight of a clathrate composition formed from about 1 part by weight of isopropyl myristate and about 5 parts by weight of urea.

7. A solid bath oil composition comprising:
   a. about 1 part by weight of sodium tripolyphosphate;
   b. about 1 part by weight of magnesium sulfate; and
   c. about 8 parts by weight of a clathrate composition formed from about 1 part by weight of isopropyl myristate and about 5 parts by weight of urea.

8. A solid bath oil composition comprising:
   a. about 5 parts by weight of sodium tripolyphosphate;
   b. about 5 parts by weight of magnesium sulfate;
   c. about 2 parts by weight of potassium alginate;
   d. about 0.5 parts by weight of perfume oil; and
   e. about 87.5 parts by weight of a clathrate composition, formed from:
      1. about 0.9 parts by weight of isopropyl myristate;

2. about 0.1 part by weight of a synthetic polymer oil obtained by reacting butyl alcohol with 1,2-propylene oxide, said polymer oil having a viscosity of 1715 Saybolt seconds at 100°F.; and
3. about 5 parts by weight of urea.

9. A solid bath oil composition comprising:
   a. about 0.9 parts by weight of Mineral Oil Light Technical;
   b. about 5 parts by weight of urea; and
   c. about 0.1 part by weight of perfume oil.

10. A solid bath oil composition comprising:
    a. about 0.8 parts by weight Mineral Oil Light Technical;
    b. about 0.1 part by weight cetyl alcohol;
    c. about 5 parts by weight urea; and
    d. about 0.1 part by weight perfume oil.

11. A solid bath oil composition comprising:
    a. about 0.9 parts by weight Mineral Oil Light Technical;
    b. about 0.1 part by weight ethoxylated cetyl alcohol containing 10 ethylene oxide groups per mol; and
    c. about 5 parts by weight urea.

12. A solid bath oil composition comprising:
    a. about 0.8 parts by weight glycerol monolaurate;
    b. about 0.1 part by weight ethoxylated cetyl alcohol containing 10 ethylene oxide groups per mol;
    c. about 0.1 part by weight isopropyl stearate; and
    d. about 5 parts by weight urea.

13. A solid bath oil composition comprising:
    a. about 1 part by weight Mineral Oil Light Technical;
    b. about 0.9 parts by weight isocetyl isostearate;
    c. about 0.1 part by weight perfume oil;
    d. about 5 parts by weight urea; and
    e. about 5 parts by weight thiourea.

14. A solid bath oil composition comprising:
    a. about 0.9 parts by weight isopropyl linoleate;
    b. about 0.1 part by weight perfume oil; and
    c. about 5 parts by weight urea.

* * * * *